C. ELSASSER.
MANURE LOADER.
APPLICATION FILED AUG. 8, 1911.
1,013,755.
Patented Jan. 2, 1912.
2 SHEETS—SHEET 2.
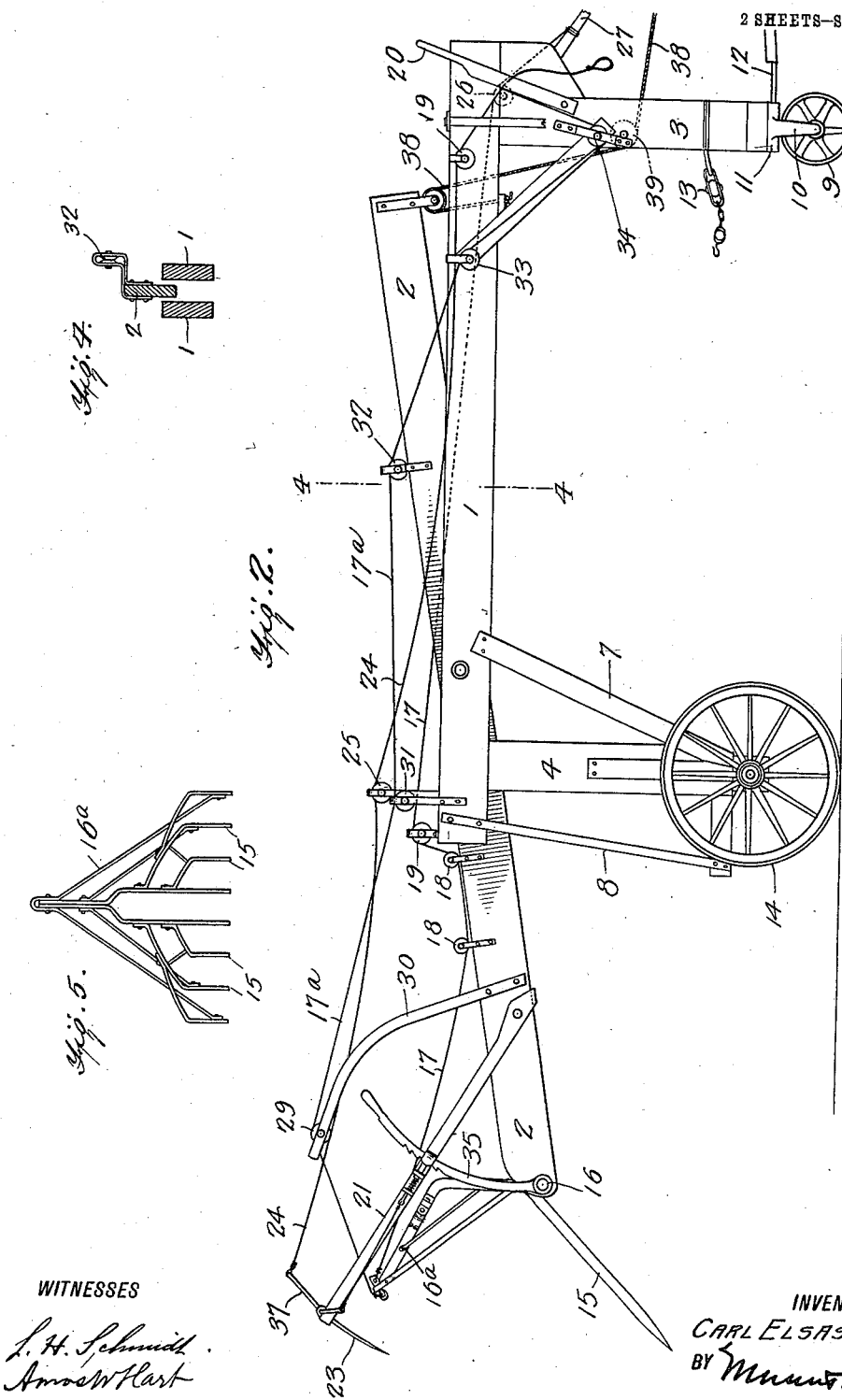
WITNESSES
L. H. Schmidt
Amos W Hart
INVENTOR
CARL ELSASSER,
BY Munn & Co.
ATTORNEYS

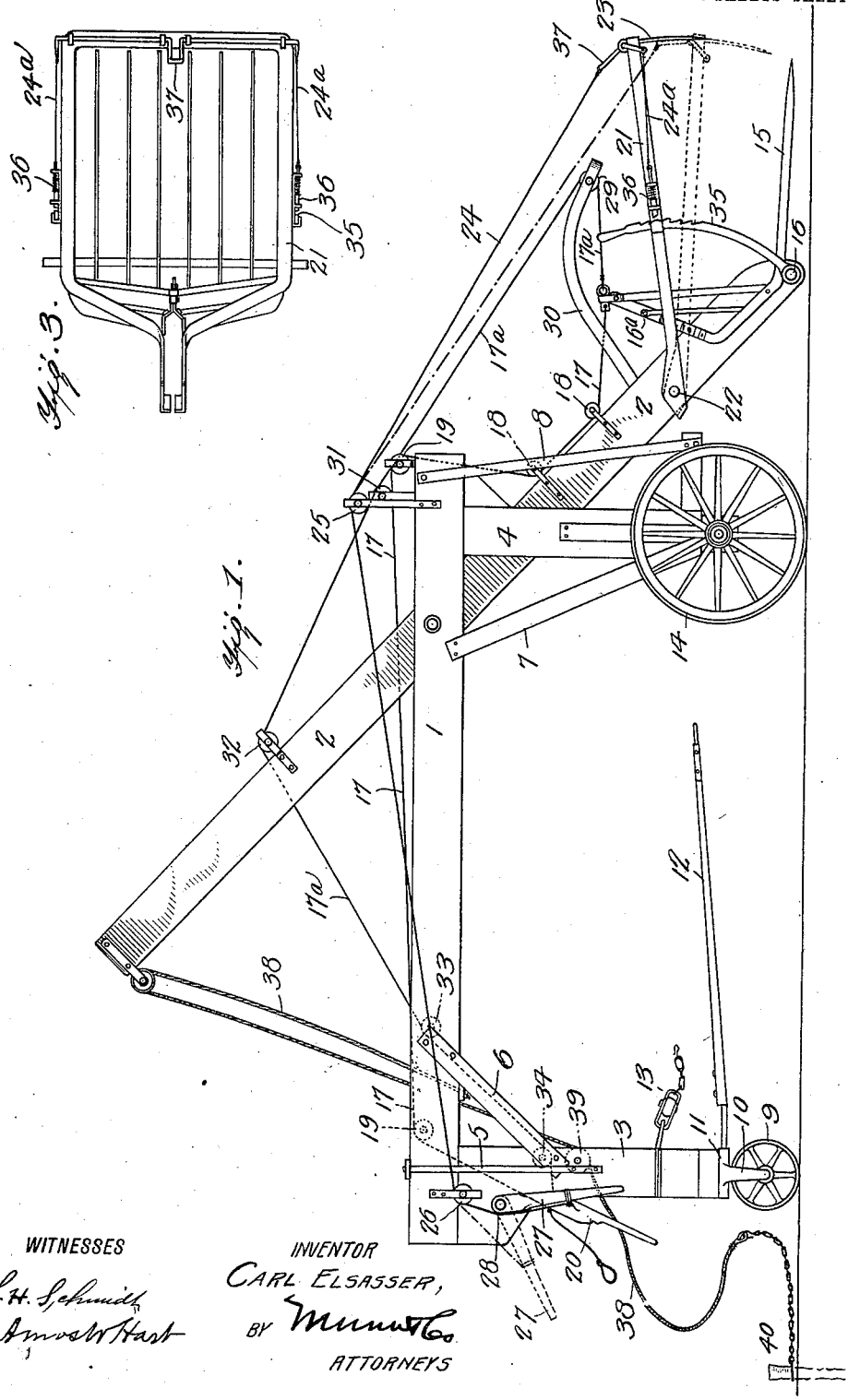

UNITED STATES PATENT OFFICE.

CARL ELSASSER, OF WAKEFIELD, KANSAS.

MANURE-LOADER.

1,013,755.      Specification of Letters Patent.      Patented Jan. 2, 1912.

Application filed August 8, 1911. Serial No. 642,984.

*To all whom it may concern:*

Be it known that I, CARL ELSASSER, a citizen of the United States, and a resident of Wakefield, in the county of Clay and State of Kansas, have invented an Improvement in Manure-Loaders, of which the following is a full, clear, and exact description.

My improvement is a wheeled apparatus for use in taking up and loading upon wagons, manure or offal found in yards or corrals. I employ a vertical frame which is mounted on wheels and adapted to be hauled by a team which is attached to the rear vertical post or portion of the frame, the same having a caster wheel which enables the frame to be readily turned to the right or left. In the front portion of the frame there is pivoted a long beam constituting a lever which is adapted to swing vertically in the frame and whose front end, projecting at the front of the frame, is provided with a fork and other devices adapted to seize and take up a quantity of manure or other material and to hold the same securely as the lever is swung for depositing the material upon a wagon. Suitable means are provided for releasing the fork and adjunctive devices when the load has been swung over a wagon. These means are under the manual control of the driver of the team. It will be understood that the fork attached to the lever, as stated is forced into or under the material as the team hauls the apparatus forward, and then, the team being reversed, the apparatus is hauled back, and, in so doing, the quantity of material lying on the fork is hauled out and away from the great body of the material before the lever is tilted to raise the load.

The details of construction, arrangement, and operation of parts are as hereinafter described, and illustrated in the accompanying drawings in which, Figure 1 is a side elevation of the apparatus showing the lever and connected parts in the position there held when the apparatus is hauled forward to take up the load; Fig. 2 is a view of the opposite side of the apparatus showing the beam and its connected parts in the position they assume when a load has been elevated and discharged; Fig. 3 is a plan view of the load-detent and fork; Fig. 4 is a cross section on the line 4—4 of Fig. 2; Fig. 5 is a rear view of the fork.

Referring, in the first instance, particularly to Figs. 1 and 2, 1 indicates two horizontal top beams, and 3 and 4 vertical posts which are connected respectively with the rear and front ends of the top beams and provided with braces for holding them rigid or fixed in position. The beams 1 and posts 3—4 are separated from each other by a narrow space, and between the forward portions of the beams is pivoted a long beam 2 that constitutes the lever adapted to swing in a vertical plane. The rear post 3 is provided with a caster wheel 9 which is journaled on an arm 10 connected rigidly with a rotatable head 11 that is pivoted to the bottom of the post. A pole or tongue 12 is rigidly connected with the caster head, and a draft attachment 13 is connected with the post 3 so that mules or horses may be attached for hauling the apparatus as required. The forward post or standard 4 is bolted to an axle supported by two running wheels 14.

To the front end of the lever 2 there is pivotally attached a fork 15 having the series of stout steel or iron tines or teeth which are rigidly attached to an axis or transverse bar 16 that forms an attachment of the lever. The rear ends of the tines are turned upward and converge to a point, and such turned-up portions constitute practically a lever which serves to operate or swing the tines as will be presently described. When the machine is operated, the tines or teeth 15 will be held in a horizontal position or nearly so, as shown in Fig. 1, so that they may be run under or into the manure or other material lying on the bottom of the yard or corral. In order to draw them into and hold them in such position, a rope 17 is attached to the rear upper ends of the tine shanks 16ª and passes under pulleys 18 attached to the lever and over pulleys 19 attached to the beams 1, its rear end being secured to a hand lever 20 that is pivoted to the front post 3, and thus adapted to be swung vertically (see Fig. 2). In Fig. 1 the fork 15 being shown horizontally it is obvious that the lever 20 must be depressed as there shown: in Fig. 2, the fork 15 being shown inclined downwardly as required to release a load, it is apparent that the lever 20 must be swung up as there shown. Thus by operating the lever 20, as here indicated, the fork may be adjusted and held temporarily in the working position or it may be released to effect discharge of the load by gravity.

When the fork 15 has been run under or into a quantity of the material which is to constitute a load for the same, it is necessary to provide means for holding the load on the fork while the lever is being tilted and the load carried to and swung over a wagon. For this purpose, I provide a detaining fork which has acquired the designation of "harpoon". The same consists of a U-shaped lever 21 whose shanks or rear ends are pivoted at 22 to the lever 2 and vertical teeth or tines 23 project downward from the head. When the apparatus is advanced to push the fork into the material that is to constitute a load, it is obvious the harpoon must be raised in the position shown in Fig. 1, and for this purpose a cord or rope 24 is connected with it and passes over pulleys 25 and 26 at the front and rear ends respectively of the beams 1 and is attached to a hand lever 27 that is pivoted at 28 to the rear post 3. Thus when the said lever 27 is turned downward in the vertical position shown in Fig. 1, the detainer or harpoon is held raised as shown; but when the fork has run under a quantity of the material that is to form a load, the lever 27 is released and allowed to swing upward and the harpoon then descends by its own gravity into the position indicated in dotted lines by Fig. 1, whereby it seizes or practically bites into and holds the quantity of the material which overlies the fork 15. When this operation has been effected, the team is turned or reversed as indicated by the position of the pole or tongue 12 in Fig. 2, and the team is then driven rearward so that the whole apparatus is hauled away from the great body of the material lying in the yard or corral and takes along with it the load, which is not raised or lifted from the ground until completely detached from the said body. When the load has been carried to the point where it is to be discharged into or upon a wagon, the lever 27 is again operated, that is to say, turned down to a vertical position so as to raise the harpoon as indicated in Fig. 2, and at the same time the other lever 20 is released so as to allow the fork 15 to tilt downward into the inclined position shown in Fig. 2, whereby the load previously held on the fork slides off by gravity.

As an aid in effecting the shifting of the fork from horizontal to inclined position so as to insure discharge of the load, a cord $17^a$ is attached to the shanks of the fork and runs forward over the pulley 29 tilted in a curved arm 30 that is fixed on the lever 2, and thence the said cord or rope $17^a$ passes over a pulley 31 on the beams 1, then over a pulley 32 on the rear portion of the lever and thence downward over pulleys 33—34 and to the lever 20. It is apparent that, by oscillating or shifting the lever 20 on its pivot, the fork 15 may be shifted or operated positively.

In order to lock the harpoon 21 in the closed position, that is to say, with its teeth 23 inserted in the load, I employ two ratchet bars 35 which are attached to the fulcrum 16 of the fork and attach spring pawls 36 to the harpoon so that they are normally engaged with the ratchet bars whose teeth project downward. The cord or rope 24 employed to raise the harpoon is attached to a bell crank lever 37 that is pivoted on the harpoon and connected by a cord $24^a$ with the ratchet pawls 36. Consequently, when tension is applied to the cord or rope 24, it first of all disengages the pawls from the ratchet, and then, by further tension the harpoon is raised. In other words, the first pull on the cord 24 releases the ratchet so that the harpoon may be raised without difficulty; but when the cord 24 is released, the springs of the pawls 36 force them back into engagement with the ratchet bars 25, and, as the harpoon descends by gravity, it becomes locked again with the ratchet.

In order to operate the lever 2, that is to say, to swing it from the inclined position shown in Fig. 1 to the nearly horizontal position shown in Fig. 2, I employ a rope 38, one end of which is attached to the beams 1, and the other passes over a pulley 39 and thence to an anchor of some kind that is fixed in the ground. The anchor may be in the form of a stake 40 which is fixed firmly in the ground.

In place of the fork, I may employ a scraper or large shovel when it is desired to use the machine for taking up material which cannot be held on the fork. It is to be understood, therefore, that in the following claims the term "fork" is usually to be regarded as in a broad or generic sense.

What I claim is:—

1. An improved apparatus for the purpose specified, comprising a wheeled frame, a lever pivoted therein and adapted to project at one end of the same, a fork pivoted to the projecting end of the lever and on a horizontal axis, and means under control of the operator for adjusting and tilting the fork, and means for tilting the lever, substantially as described.

2. An improved apparatus, comprising a wheeled frame, a lever pivoted therein and adapted to project at the end of the same, means for tilting the lever in a vertical frame, a fork pivoted to the projecting end of the lever, and means for adjusting it for supporting a load and releasing the same, and a load-detent consisting of a bar pivoted to the lever and provided at its free end with teeth to take into the material supported by the fork, and means for adjusting such detent, substantially as described.

3. An apparatus for the purpose specified, comprising a wheeled frame, a lever pivoted therein and projecting therefrom, means for tilting the lever vertically as required for raising and discharging a load, a fork adapted to take up material, and means for adjusting it as required, a load-detent pivoted to the lever and arranged above the fork, and comprising a frame provided at its free end with teeth for penetrating the material taken up by the fork, ratchet bars pivotally attached to the lever, and pawls on the detent which are adapted to engage the same for holding the detent when lowered, and means connected with the detent for raising it and also operating the ratchet pawls, substantially as described.

4. An improved apparatus, comprising a wheeled frame arranged vertically and comprising duplicate parts which are separated by a narrow space, a lever pivoted in such space adjacent to the rear end of the frame and projecting from the latter, a rope attached to the front end of the lever for depressing it and thus raising a load at the opposite end, a fork pivotally connected with the front end of the lever and adapted to swing in a vertical plane as required to adjust it for taking up, supporting and releasing a load.

5. A load detent, comprising a U-shaped frame pivoted to the lever above the fork and provided at its free end with teeth adapted to engage material and thus hold a load on the fork, ratchet bars attached to the lever and working in guides on the detent, spring pawls adapted to engage such ratchet bars, a crank lever pivoted on the detent, and shafts connecting it with the pawls and tension rope also attached to it, and a lever pivoted on the front end of the frame to which such rope is attached, substantially as described.

6. In an apparatus for the purpose specified, the combination with a wheeled frame having a vertical slot, a lever pivoted in the slot and projecting at the front end of the frame, a fork pivoted to such end and having an extended shank, a rope attached to such shank and passing over guides on the frame, and a hand lever pivoted to the rear end of the frame to which such rope is connected whereby the fork may be operated as specified.

7. An apparatus for the purpose specified, comprising a wheeled frame consisting of a horizontal top portion and vertical pendant posts, the parts being so arranged as to leave space between the posts for maneuvering a team, the rear post having a tongue and draft attachment adapted to swing around it, a lever pivoted in the front portion of the frame and having means attached to its projecting end for taking into, supporting and holding a load, and a tension rope connected with the rear end of the lever and passing over guides on the frame whereby it is adapted to operate the lever for tilting it in the manner described.

CARL ELSASSER.

Witnesses:
S. P. HAMILTON,
M. A. LEWIS.

Copies of this patent may be obtained for five cents each, by addressing the "Commissioner of Patents, Washington, D. C."